(12) United States Patent
Abugov et al.

(10) Patent No.: US 7,580,927 B1
(45) Date of Patent: Aug. 25, 2009

(54) QUADTREE CENTER TILE/BOUNDARY TILE OPTIMIZATION

(75) Inventors: Daniel Abugov, Amherst, NH (US); Daniel Geringer, Potomac, MD (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/865,597

(22) Filed: May 29, 2001

(51) Int. Cl.
*G06F 17/00* (2006.01)
(52) U.S. Cl. .................. 707/4; 707/104.1; 345/423
(58) Field of Classification Search .............. 707/104.1, 707/2, 100, 6, 3, 4; 345/423
See application file for complete search history.

(56) References Cited

U.S. PATENT DOCUMENTS

| | | | |
|---|---|---|---|
| 5,251,296 A * | 10/1993 | Rhoden et al. | 345/564 |
| 5,363,098 A | 11/1994 | Antoshenkov | |
| 5,953,531 A * | 9/1999 | Megiddo et al. | 717/160 |
| 5,953,722 A * | 9/1999 | Lampert et al. | 707/100 |
| 5,963,956 A * | 10/1999 | Smartt | 707/104.1 |
| 6,104,416 A * | 8/2000 | McGuinness | 345/544 |
| 6,216,130 B1 * | 4/2001 | Hougaard et al. | 707/10 |
| 6,282,540 B1 * | 8/2001 | Goldensher et al. | 707/6 |
| 6,415,227 B1 * | 7/2002 | Lin | 701/213 |
| 6,437,780 B1 * | 8/2002 | Baltaretu et al. | 345/423 |
| 6,463,433 B1 * | 10/2002 | Baclawski | 707/5 |
| 6,470,287 B1 * | 10/2002 | Smartt | 702/102 |
| 6,549,674 B1 * | 4/2003 | Chui et al. | 382/240 |
| 6,684,219 B1 * | 1/2004 | Shaw et al. | 707/103 R |
| 6,768,997 B2 * | 7/2004 | Schirmer et al. | 707/102 |
| 6,879,980 B1 * | 4/2005 | Kothuri et al. | 707/5 |

OTHER PUBLICATIONS

Prabhakaran et al., A Semantic Database Approach for Tilings, Databases, Parallel Architectures and Their Applications, PARBASE-90, International, Mar. 7-9, 1990, pp. 447-452.*
Spatial Quadtree Indexing, Oracle Spatial User's Guide and Reference for Oracle Release 8.1.6, Dec. 1999.

* cited by examiner

*Primary Examiner*—Greta L Robinson
(74) *Attorney, Agent, or Firm*—Hanify & King, P.C.

(57) ABSTRACT

A method for determining positional relationships among objects represented in a database. A plurality of tiles are defined. A distribution of objects with respect to the tiles is determined. The distribution of objects is compared with respect to the tiles to identify objects fulfilling a primary filter condition related to an interaction of the objects with respect to the tiles. Objects are identified that fulfill a secondary filter condition related to an interaction of the geometries of the objects by analyzing the distribution of objects that fulfill the primary filter condition with respect to the tiles. Objects are identified that fulfill the secondary filter condition by comparing geometries of objects that fulfill the primary filter condition that the analysis does not identify as fulfilling the secondary filter condition.

19 Claims, 8 Drawing Sheets

| | | | |
|---|---|---|---|
| 2 | | 3 | |
| 0 | | 1 | |

| 22 | 23 | 32 | 33 |
|---|---|---|---|
| 20 | 21 | 30 | 31 |
| 02 | 03 | 12 | 13 |
| 00 | 01 | 10 | 11 |

LINEAR SORTING    LINEAR SORTING    SPACE-FILLING CURVE

PRIOR ART　　　　　　　　　　　　PRIOR ART

OBJECT A IN
OBJECT B

OBJECT A IN OBJECT B,
BOUNDARIES TOUCHING

OBJECT A OUTSIDE
OBJECT B, BOUNDARIES
TOUCHING

INTERIOR OF LINE
INTERSECTS BOUNDARY
OF POLYGON

BOUNDARY OF LINE
INTERSECTS BOUNDARY
OF POLYGON

BOUNDARIES OF TWO
POLYGONS INTERSECT

TWO OBJECTS
EQUAL

TWO OBJECTS DISJOINT
AND DO NOT INTERSECT

QUADTREE CENTER TILE/BOUNDARY TILE OPTIMIZATION

FIELD OF THE INVENTION

The present invention relates to a method for determining relationships among objects in a database.

BACKGROUND OF THE INVENTION

One system for organizing data in particular types of databases is the quadtree index. A quadtree index is a two-dimensional equivalent to a conventional binary index used to locate data within a linear array, and is typically used to locate points in a two-dimensional space.

In the linear quadtree indexing scheme, the coordinate space (for the layer where all geometric objects are located) is subjected to a process called tessellation, which defines exclusive and exhaustive cover tiles for every stored geometry. Tessellation may be carried out by decomposing the coordinate space in a regular hierarchical manner. The range of coordinates, the coordinate space, may be viewed as a rectangle.

At the first level of decomposition, the rectangle may be divided into halves along each coordinate dimension generating four tiles. Each tile that interacts with the geometry being tessellated may be further decomposed into four tiles. This process continues until some termination criteria, such as size of the tiles or the maximum number of tiles to cover the geometry, is met.

Either fixed-size or variable-sized tiles may be utilized to cover a geometry. Fixed-size tiles may be controlled by tile resolution. If the resolution is the sole controlling factor, then tessellation can terminate when the coordinate space has been decomposed a specific number of times. Therefore, each tile is of a fixed size and shape.

Variable-sized tiling may be controlled by the value supplied for the maximum number of tiles. If the number of tiles per geometry, n, is the sole controlling factor, the tessellation terminates when n tiles have been used to cover the given geometry.

Smaller fixed-size tiles or more variable-sized tiles provide better geometry approximations. The smaller the number of tiles, or the larger the tiles, the coarser are the approximations.

The process of determining which tiles cover a given geometry is called tessellation. The tessellation process is a quadtree decomposition, where the two-dimensional coordinate space is broken down into four covering tiles of equal size. Successive tessellations divide those tiles that interact with the geometry down into smaller tiles, and this process continues until the desired level or number of tiles has been achieved. The results of the tessellation process on a geometry are stored in a table.

The tiles at a particular level can be linearly sorted by systematically visiting tiles in an order determined by a space-filling curve as shown in FIGS. 1A, 1B, and 1C. The tiles can also be assigned unique numeric identifiers, known as Morton codes or z-values. The terms tile and tile code will be used herein interchangeably in this and other sections related to spatial indexing.

The indexing may be carried out in a variety of ways. One indexing method is known as fixed indexing. Fixed spatial indexing uses tiles of equal size to cover a geometry. Because all the tiles are the same size, they all have codes of the same length, and the standard equality operator can be used to compare tiles during a join operation. This results in excellent performance characteristics. Two geometries are likely to interact, and hence pass the primary filter stage, if they share one or more tiles.

Alternatively, hybrid indexing may be utilized. Hybrid indexing can utilize tiles that do not all have the same dimensions. In fact, hybrid indexing can utilize tiles that have fixed dimensions and tiles that have variable dimensions. A set of fixed tiles and a set of variable dimension tiles may each fully cover a geometry.

As described above, fixed and hybrid indexing may be utilized in spatial quadtree indexing. The effectiveness and efficiency of a fixed indexing method can depend upon the tiling level and the variation in size of the geometries in the layer. While a small fixed-size tile is typically selected to cover small geometries, if a similar size tile is utilized to cover a very large geometry, a large number of tiles would be required. However, if the chosen tile size is large, so that fewer tiles are generated in the case of a large geometry, then the index selectivity suffers because the large tiles do not approximate the small geometries very well. FIGS. 2 and 3 illustrate relationships between tile size, selectivity, and the number of cover tiles.

FIG. 2 illustrates a small fixed-size tile. With a small fixed size tile, selectivity is good. However, a large number of tiles is needed to cover large geometries. In the example shown in FIG. 2, a window query would easily identify geometries A and B, but would reject C.

In contrast to the example shown in FIG. 2, FIG. 3 illustrates a large fixed-size tile. With a large fixed size tile, fewer tiles are needed to cover the geometries. However, the selectivity of large fixed size tiles is not as good as small tiles. The same window query shown in FIG. 2 would probably pick up all three geometries. Any object that shares tile T1 or T2 would identify object C as a candidate, even though the objects may be far apart, such as objects B and C are in FIG. 3.

All elements in a geometry are tessellated. In a multi-element geometry, if a second element were covered by a tile from the tessellation of a first element and retiling resulted in subdivision of a larger tile into smaller tiles, one of which was completely contained in the second element, then that tile would be excluded with respect to the second element because it would not interact with the geometry.

Quadtree hybrid indexing uses a combination of fixed-size and variable-sized tiles for spatially indexing a layer. Variable-sized tile spatial indexing uses tiles of different sizes to approximate a geometry. Each geometry will have an associated set of fixed-size tiles that fully cover the geometry, and also an associated set of variable-sized tiles that fully cover the geometry.

For most applications, hybrid indexes are not utilized. Rather, quadtree fixed indexes or R-tree indexes are employed instead. The circumstances where hybrid indexes typically are considered can include when joins are required between layers having significantly different optimal fixed index level values or tile resolution, such as on the order of four or more levels. It may be possible to obtain better performance by bringing a layer with a higher optimal level down to a lower level and adding a parameter to ensure adequate tiling of the layer.

The best starting value for the number of tiles in a new hybrid layer can be calculated by obtaining a count of the number of rows in the spatial index table and dividing this number by the number of rows with geometries in the layer, then rounding up. A spatial join is not a common requirement for applications, and it is comparable to a spatial cross product where each of the geometries in one layer will be compared with each of the geometries in the other layer.

When both of the following are true for a single layer, hybrid indexing may also be preferable. First, a layer has a mixture of many geometries covering a very small area and many polygons covering a very large area. Second, an optimal fixed tiling level for the very small geometries will result in an extremely large number of tiles to be generated for the very large geometries, causing the spatial index to grow to an unreasonable size. If both of these conditions are true, it may be better to use the a parameter to obtain coverage for the smaller geometries, while keeping the fixed tile size relatively large for the large geometries by using a smaller level value.

FIG. 4 illustrates variable-sized cover tiles closely approximate each geometry. This results in good selectivity. The number of variable tiles needed to cover a geometry may be controlled using an appropriate parameter. A variable tile is subdivided if it interacts with the geometry, and subdivision will not result in tiles that are smaller than a predetermined size. This size, or tiling resolution, is determined by a default maximum tile value.

The following includes a description of the creation of a hybrid index. This section describes hybrid indexing, which uses both fixed-size and variable-sized tiles as a spatial indexing mechanism. For each geometry, a set of fixed-size tiles that fully covers the geometry is created. Additionally, a set of variable-sized tiles that fully covers the geometry is also generated. The terms "hybrid indexing", "hybrid tiling", and "hybrid tessellation" are used interchangeably in this section.

To use hybrid tiling, the level of tiling and the number of tiles typically are greater than 1. The value for the number of tiles determines the number of variable tiles that will be used to fully cover a geometry being indexed. Typically this value is small. For points, the number of tiles is always one. For other element types, the number of tiles could arbitrarily be set to a value. For example, a value of about eight could be utilized. In general, the greater the number of tiles, the better the tiles will approximate the geometry being covered. A larger value for the number of tiles can improve the selectivity of the primary filter. However, a larger value also increases the number of index entries per geometry. The number of tiles typically should be larger for long, linear spatial entities, such as major highways or rivers, than for area-related spatial entities, such as county or state boundaries.

The tiling level value can be utilized to determine the size of the fixed tiles used to fully cover the geometry being indexed. Setting a desirable value for tiling level may appears to include a great deal of guess work and may require performing data analysis and testing to determine a suitable value. One approach would be to utilize one value to determine an appropriate starting value, and then compare the performance with slightly higher or lower values.

Hybrid indexes can require tuning to optimize the index. Along these lines, hybrid indexing allows indexes to be built using the tiling mechanism by specifying the level of tiling. Additionally, hybrid indexing introduces the ability to specify the minimum number of tiles to be created for each geometry during the indexing process. If the number of tiles created for a geometry using one tiling level value is less then the value specified by the number of tiles value, then the indexing process continues by creating more tiles for the geometry until the number of tiles value has been reached.

The ability to specify the minimum number of tiles for each geometry is important for a number of reasons. It ensures that all geometries will have at least as many index entries as the number of tiles value, regardless of the tiling level. Also, it can reduce the space required for index data to get full indexing coverage of all geometries, as compared to fixed indexing. Furthermore, if hybrid indexing is used and if the layer being indexed is point-only data, the number of tiles value should be set to 1.

An element list typically includes the location of an element, such as the x and y coordinates of the element, if the element is a point and the tree is a Cartesian quadtree, a pointer to the corresponding element in a separate data structure such as the underlying "model" defining a geometric image in a computer assisted drawing program, and a pointer to the next associated element (if any). A quadtree index may be maintained using straightforward housekeeping routines for creating, deleting, and maintaining the quadtree index and its associated data structures.

In a spatial database, the quadtree can represent a map of a geographic region. The location of each element can represent the location of a feature in the region. For example, the elements could be dwelling units, businesses, parks, subway stations, museums, or any other desired object.

The determination of the positional relationship between two objects is an important aspect of spatial data processing. The process for determining whether objects interact is done in two stages.

The first phase compares the tiles that were generated as a result of the tesselation completed when the spatial index was built. This is known as the primary filter, and it uses the tile code comparisons to determine whether the geometries are likely to interact. Since the tile coverage of each geometry is complete, if any of the tile codes of one geometry match the tile codes of another geometry, then the geometries are passed to the next stage of processing known as the secondary filter. If none of the tile codes match, then there is no spatial interaction between the geometries, and no further processing is required to determine if the geometries interact.

The secondary filter stage does the full geometric comparisons between the two geometries to determine the relationship between them. This is a costly task, utilizing a lot of CPU and time to make the geometric calculations.

SUMMARY OF THE INVENTION

Regardless of the organization of the data in a database, it is often desired to determine relationships among the data. The nature of the process for determining relationships among data in a database can depend upon the nature and organization of the information stored in the database and the relationships that are being determined. In the case of a spatial database, it may be desired to determine relative positions of elements with respect to each other. In many cases, regardless of the database or its organization, the determination of relationships can overwhelm computing and memory capabilities. Alternatively or additionally, calculating relationships among objects can require inordinate amounts of time.

The present invention provides a solution for comparing objects in databases that can significantly reduce the time and computations required to determine relationships among data in a database. As such, the present invention provides a method for determining positional relationships among objects represented in a database. According to the method, new information is stored in the spatial index, associating each tile code with information about whether the tile only touches the boundary of the geometry it covers ("B") or whether the tile is completely interior ("I") to the geometry it covers. This information is used during the primary filter stage when a determination is made as to whether two geometrical objects are likely to interact by comparing the tiles associated with each of the objects being compared. This is a fast lookup in a database. The invention provides for matching the tile codes, and additionally using the boundary and interior codes to help quickly do one of three things:

1. determine the exact match relationship between geometry objects;
2. eliminate the possibility that objects have certain exact match relationships; or
3. pass the geometry on to the secondary filter for expensive geometric processing.

Additionally, the present invention provides a method for determining positional relationships among objects represented in a database. According to the method, a plurality of is tiles. A distribution of objects with respect to the tiles is defined. The distribution of objects with respect to the tiles is compared to identify objects fulfilling a primary filter condition relating to an interaction of the objects with respect to the tiles. Objects are identified that fulfill a secondary filter condition, relating to an interaction of the geometries of the objects, by analyzing the distribution of objects that fulfill the primary filter condition with respect to the tiles. Objects are identified that fulfill the secondary filter condition by comparing geometries of objects that fulfill the primary filter condition that the analysis does not identify as fulfilling the secondary filter condition.

Other aspects of the present invention relate to a computer program product for performing a process for determining positional relationships among objects represented in a database in a computer system. The product includes a computer readable medium and computer program instructions recorded on the computer readable medium and executable by a processor. The instructions perform the steps of identifying tiles. The steps also include determining relationships of objects with respect to the tiles (interior or boundary). Additionally, the steps compare the distribution of objects with respect to the tiles to identify objects fulfilling a primary filter condition related to an interaction of the objects with respect to the tiles. Furthermore, the steps identify objects that fulfill a secondary filter condition, in which case they 1D are returned with no additional processing as part of the final result set; objects that can be rejected based on a secondary filter condition, in which case the objects are discarded; and geometries that may or may not meet the specific secondary filter condition, which are passed to the secondary filter for further processing.

Furthermore, the present invention relates to a computer program product for performing a process for determining positional relationships among objects represented in a database in a computer system. The product includes a computer readable medium and computer program instructions recorded on the computer readable medium and executable by a processor. The instructions perform the steps of defining a plurality of tiles, determining a distribution of objects with respect to the tiles, comparing the distribution of objects with respect to the tiles to identify objects fulfilling a primary filter condition related to an interaction of the objects with respect to the tiles, identifying objects that fulfill a secondary filter condition relating to an interaction of the geometries of the objects by analyzing the distribution of objects that fulfill the primary filter condition with respect to the tiles, and identifying objects that fulfill the secondary filter condition by comparing geometries of objects that fulfill the primary filter condition that the analysis does not identify as fulfilling the secondary filter condition.

Furthermore, the present invention provides a system for performing a process method for determining positional relationships among objects represented in a database. The system includes a processor operable to execute computer program instructions and a memory operable to store computer program instructions executable by the processor. The instructions are for performing the steps of defining a plurality of tiles, determining a distribution of objects with respect to the tiles, comparing the distribution of objects with respect to the tiles to identify objects fulfilling a primary filter condition related to an interaction of the objects with respect to the tiles, identifying objects that fulfill a secondary filter condition relating to an interaction of the geometries of the objects by analyzing the distribution of objects that fulfill the primary filter condition with respect to the tiles, and identifying objects that fulfill the secondary filter condition by comparing geometries of objects that fulfill the primary filter condition that the analysis does not identify as fulfilling the secondary filter condition.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings and description are to be regarded as illustrative in nature and not as restrictive.

BRIEF DESCRIPTION OF THE DRAWINGS

Objects and advantages of the present invention will be more clearly understood when considered in conjunction with the accompanying drawings, in which.

DESCRIPTION OF THE PREFERRED EMBODIMENT(S)

Figures 1A, 1B, 1C:
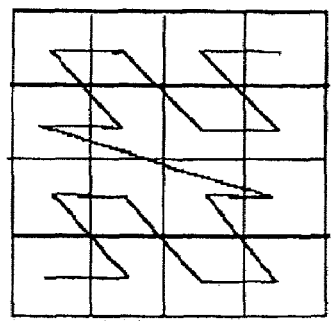
FIGS. 1A, 1B, and 1C represent an example of linear sorting of tiles at a particular level by systematically visiting tiles in an order determined by a space-filling curve.
Figure 2:
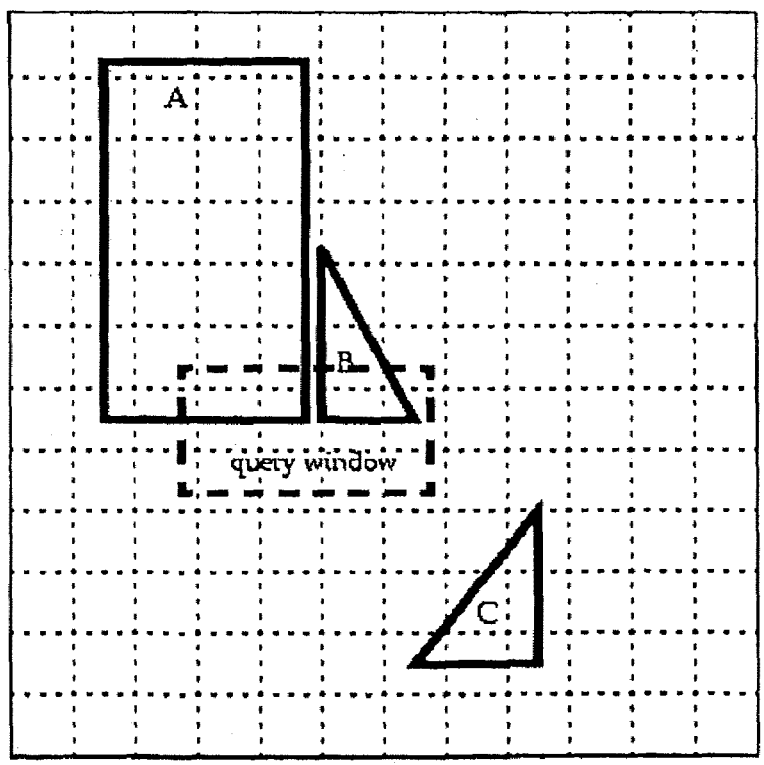
FIG. 2 represents an example of fixed indexing including fixed-size relatively smaller tiles to cover the geometries shown.
Figure 3:
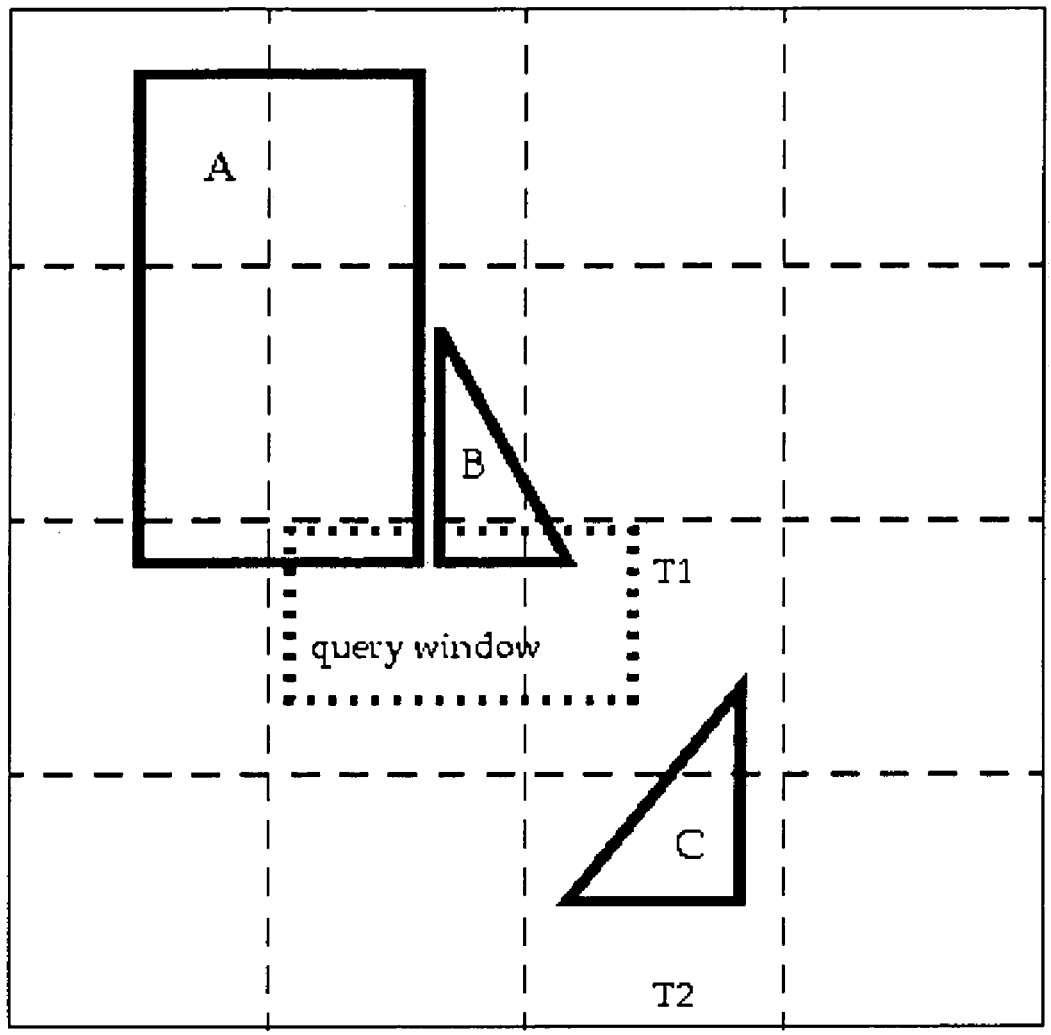
FIG. 3 represents an example of fixed indexing including fixed-size relatively larger tiles to cover the geometries shown.

A spatial or geographic database includes data concerning locations of features in a space or on a surface. For example, a geographical database can include data concerning the location of various objects in a region. Along these lines, a geographic database can include mathematical representations of roads, counties, cities, homes, apartment buildings, parks, businesses, subway stations, rail lines, and other features. The location information could be in the form of latitude and longitude data or other data that defines position. Other information such as addresses and the nature of businesses or other locations can also be included in the database.

Once a database including this information is created it is typically desired to access and utilize the information. One way that the information in the databases is utilized involves determining the position of particular locations. Along these lines, a person might want to find a dry cleaner at a certain location. Often, it is desired to find a certain type of business or other location in relation to another, user-specified location. For example, a person might desire to find the ten nearest restaurants of a specified location. At times, it may be desirable to determine whether objects in a database have overlapping locations and, if so, the extent of the overlap.

Analyses such as those described above of data in spatial and geographic databases can present a number of problems. To determine relationships among data in a database can overtax memory and computing power, take an unacceptable period of time or cost an unacceptable amount of money. This is especially true with data in spatial and geographic databases.

For example, one problem concerning trying to determine whether objects have overlapping locations can involve actually comparing the outlines of the objects to see if any interactions exist. In the case of finding streets in a certain location, the line or curve defining the streets could be compared with a polygon that defines the location of interest. In either case, carrying out a point-by-point comparison of two geometries typically requires quite a long time, in many cases, on the order of hours.

The present invention provides a solution to problems of analyzing databases indexed utilizing spatial indices. As such, the present invention provides a fast and simple method for determining whether two objects, or geometries, defined by data in a database intersect. Rather than taking hours to carry out, the present invention can take on the order of seconds. In fact, the present invention can improve response times by as much as an order of magnitude or more over a method that includes a complete comparison of the geometries of objects involved. By reducing calculation times, the present invention frees up a processor to perform other calculations. The present invention also permits better service to be provided by reducing response times. This helps to ensure that the solution can be utilized with any spatial database, regardless of how large.

A quadtree is one index that may be utilized to organize data in spatial and geographic database systems. A general discussion of the quadtree appears above. In addition to storing a true geometry for objects in a database, the present invention stores an approximation of the geometry.

The approximation may include a plurality of tiles and the relationship between a geometry and tile(s) that the geometry intersects. The tiles may be the same size and/or shape. Along these lines, in some cases, the tiles may have the same shape but variable sizes. Alternatively, the tiles may have variable shapes with sizes that may or may not be the same. Typically, the tiles are rectangular and all have the same size. In one case, the tiles may be thought of as a grid of rectangles on a paper. Every geometry, whether representing a street, county, zip code region, town, business location or any other object, will fall on the tiles or vice versa completely, partially, or not at all.

The number of tiles defined and the area covered by the tiles may vary. According to one embodiment, the number of tiles is 500. However, the number of tiles may vary from one up to a maximum number that the computer memory is capable of handling. One skilled in the art could determine the maximum number of tiles without undue experimentation once aware of the disclosure contained herein. Defining a greater number of tiles may increase the resolution of the process, whereas a small number may provide more rough results that require greater amounts of exact mathematical calculations.

As the tiles are generated, each tile may be assigned a tile code and an associated geometry. Once the tiles are defined, the intersection or distribution of the objects and the tiles may be determined and stored. A tile may lie entirely or partially within a geometry. Alternatively, a tile may lie entirely outside of a geometry. In the latter case, the location of the tile with respect to the geometry is not recorded.

If a tile lies entirely within a geometry, even if the tile touches the boundary of the geometry, the tile is classified as an interior tile. On the other hand, if any portion of a tile at least partially lies outside of the geometry, the tile is classified as a boundary tile. Tiles that lie outside of and do not intersect a geometry at all typically are not included in the approximation of the geometry stored in the database.

Figure 4:
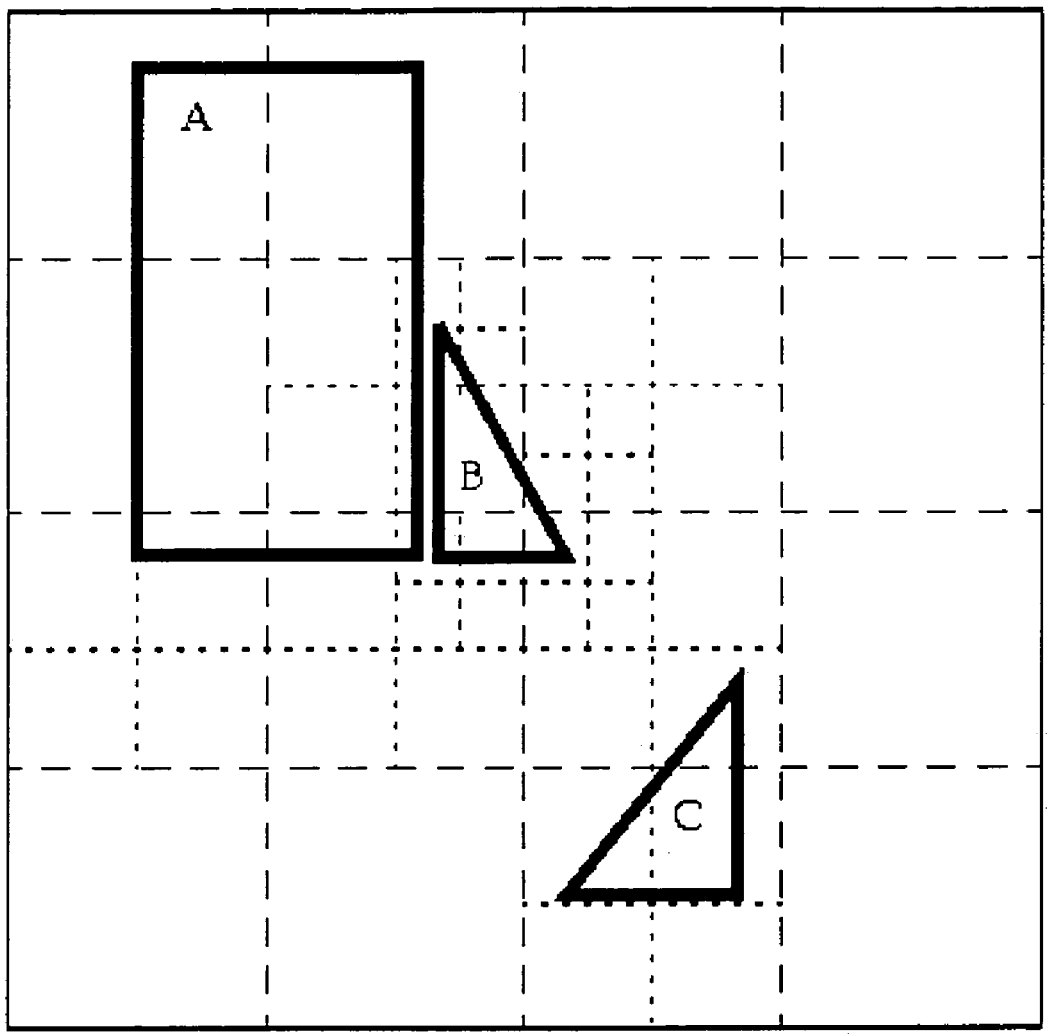
FIG. 4 represents an example of hybrid indexing including variable-sized cover tiles utilized to closely approximate each geometry shown.
Figure 5:
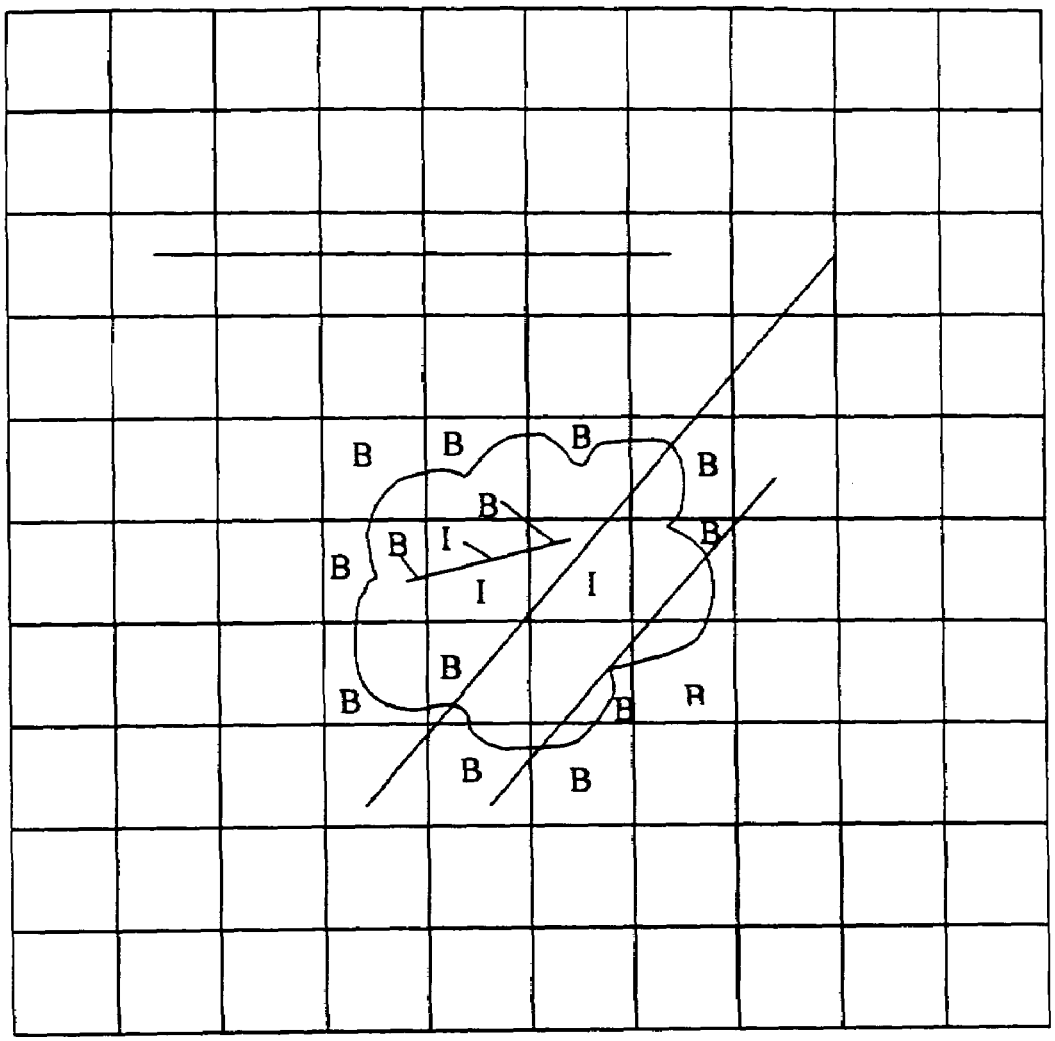
FIG. 5 represents a diagram that shows two types of geometries and a set of tiles superimposed on the geometries.

FIG. 4 illustrates a visualization of a simple example of a few objects and tiles for illustration purposes. The linear objects shown in FIG. 5 could be considered roads and the cloud-like object a region, such as a town or county. In FIG. 5, the boundary and interior tiles for the region and one of the linear objects within the region are identified.

After definition of the tiles and determining the distribution of objects with respect to the tiles, the present invention may quickly determine the relationship among objects in a database. This process begins by comparing the distribution of objects with respect to the tiles. Since the tiles are simply classified as border or interior tiles, by first knowing the distribution of the objects with respect to the tiles, the first part of the process may be very quickly and easily be carried out.

The first part of the process is carried out utilizing a primary filter condition to compare the tiles. The primary filter condition typically includes determining whether the objects being compared have any tiles in common. This is a much simpler process that simply compares tiles rather than all of the points representing a geometry. Although the tile comparison is a rough comparison as compared to comparing exact geometries, the tile comparison is much simpler and quicker than the exact geometry comparison.

Figure 6A:
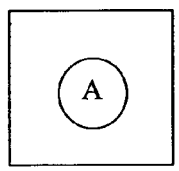
FIGS. 6a-h represent diagrams that illustrate possible interactions between geometries.
Figure 6B:
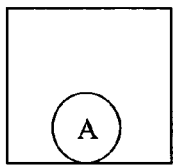

In conducting the analysis, objects can be found to interact in a variety of ways. FIGS. 6a-h illustrate a variety of interactions between two objects. Along these lines, FIG. 6a shows object A and object B. Depending upon how the analysis is being carried out, this situation can be characterized as object A in object B or object B containing object A. Somewhat similarly, FIG. 6b illustrates object A in object B with the boundaries of the two objects touching. Alternatively, this may be considered to show object B covering object A with the boundaries of the two objects touching.

Figure 6C:
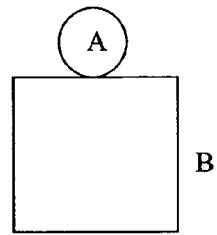

FIG. 6c illustrates cases where only a boundary of the two objects touch. Again, depending upon the search strategy, this may be described as object A not in object B with boundaries of the objects touching. Alternatively, this may be considered as object B not covering object A, with boundaries of the objects touching.

Figure 6D:
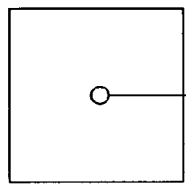
Figure 6E:
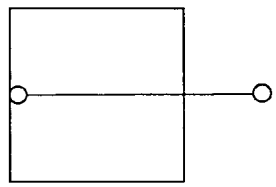
Figure 6F:
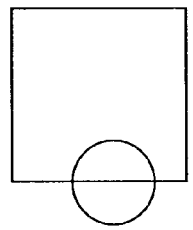

FIGS. 6d and 6e illustrate configurations involving a line and a polygon. FIG. 6d shows a line, where the circles indicate the end of the line, which in the case of a line form the "boundary" of the line. Therefore, FIG. 6d represents a case where two objects intersect, the boundaries of the two objects do not touch, and the interior of the line intersects the boundary of the polygon.

FIG. 6e represents a situation where the two objects intersect and the "boundary" of the line intersects the boundary of the polygon. Similarly, FIG. 6f exemplifies a case where the boundaries of the two objects intersect, but with two polygons rather than a polygon and a line.

Figure 6G:
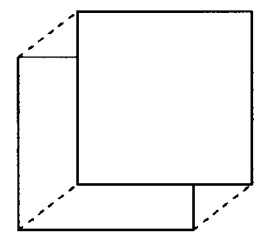
Figure 6H:
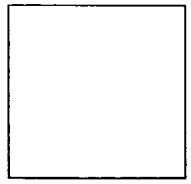

FIG. 6g shows a case where the two objects are equal. On the other hand, FIG. 6h illustrates a case where the two objects are disjoint and do not intersect or have any points in common.

Any of the interactions shown in FIGS. 6a-h may be utilized to define the primary filter. In practice, at least one of the conditions shown in FIGS. 6a-h may be used as the primary filter condition. In other words, one, two, or up to all of the conditions shown in FIG. 6a-g or 6h may be used. In the case where all of the conditions shown in FIGS. 6a-g are used as the primary filter condition, the primary filter can identify configurations where the objects share at least one point in common.

A significant additional benefit of starting the analysis by subjecting the objects to a primary filter is that as tiles are compared, if a first geometry lies entirely within a second geometry, no further processing may be necessary on the second geometry. This is because comparing the exact geometries would not produce any additional information; it is already known that the first geometry and the second geometry entirely overlap. Similarly, if the first geometry and the second geometry have interior tiles in common, no additional searching may be necessary.

Figure 7:
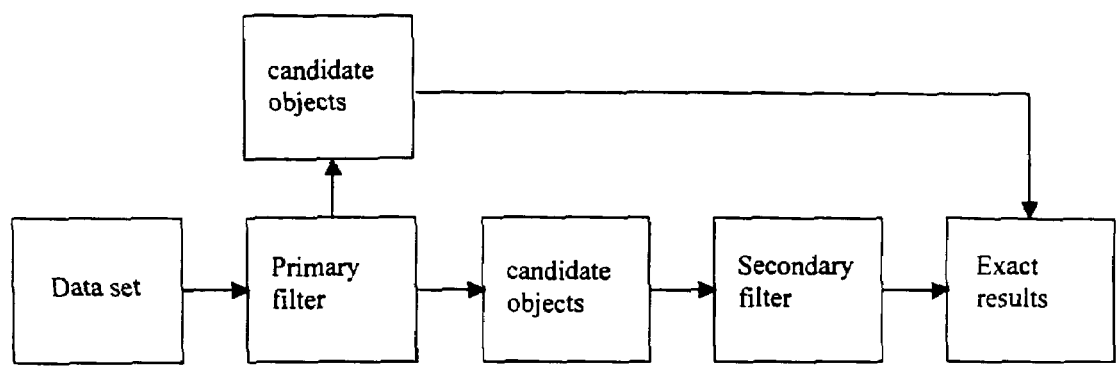
FIG. 7 represents a flow chart that illustrates steps involved in a process according to the present invention.

In illustrating the flow of steps in the analysis of the process according to the present invention, FIG. 7 shows how the present invention can eliminate a set of candidate objects from the involved secondary filter. In the flowchart represented in FIG. 7, a data set describing the objects is subjected to the primary filter as described above. The primary filter actually produces three sets of objects. One set of objects that is not represented in FIG. 7 includes objects that are entirely ruled by the primary filter. Subjecting the data to the primary filter also produces two sets of candidate objects. One set of candidate objects is assumed to have fulfilled the secondary filter and represents a portion of the exact results. The other set of candidate objects may not be assumed to pass the secondary filter condition until the secondary filter process is carried out. A portion of this second set of candidate objects may also form part of the exact results. Of course, the secondary filter may also produce a set of objects that are ruled out as not fulfilling the requirements of the exact results.

According to one particular example, the first geometry represents streets and the second geometry represents a geographic region, such as a county or zip code region. In this example, the process is searching for streets that intersect a county or zip code. The primary filter can quickly and easily confirm that a street lies in a geographic region if the street and geographic region share interior tiles or an interior tile of the geographic region is common to a boundary tile of the street. The first filter can also eliminate candidate streets if the streets and geographic region do not share any tiles at all. In the situation where boundary or tiles of the street are common to boundary tiles of the geographic region, then the precise comparison of the geographic region would be carried out. Of course, the first and second geometries may represent different objects, the primary filter condition may differ and other variables may differ. Therefore, the analysis carried out to determine whether objects fulfill first filter condition may vary. Naturally, variations also occur in the portion of objects either eliminated by the primary filter from further consideration or that the secondary filter will be applied to.

After completion of the primary filter process, the secondary filter will mathematically compare the geometries of the streets and the geographic region to determine whether they truly interact. Application of the secondary filter will confirm whether two objects do, in fact, interact in a prescribed manner. Application of the secondary filter to all objects that fulfill the primary filter condition can still be very costly and time consuming, particularly if the data is very dense. This is where the present invention comes in.

The present invention greatly improves the above-described search process by marking the tiles as either boundary or interior tiles. As described above, the present invention utilizes the tile marking and the results of the primary filter to reduce the set of objects to which the secondary filter must be applied. In the example described above, any streets that touch interior tiles of the geographic region are classified as having passed the secondary filter. Therefore, the actual mathematical comparison need not be carried out. However, the mathematical comparison will be carried out if an object only touches a boundary tile. For database queries, a structured query language statement can be written to specify the conditions that will permit the assumption to be made that an object has passed the secondary filter.

The value of the present invention relative to time and cost saving increases with an increased number and/or density of objects. This results from an increased number of candidate objects being automatically accepted as having fulfilled the secondary filter condition without having to carryout the expensive mathematical computation.

Figure 8:
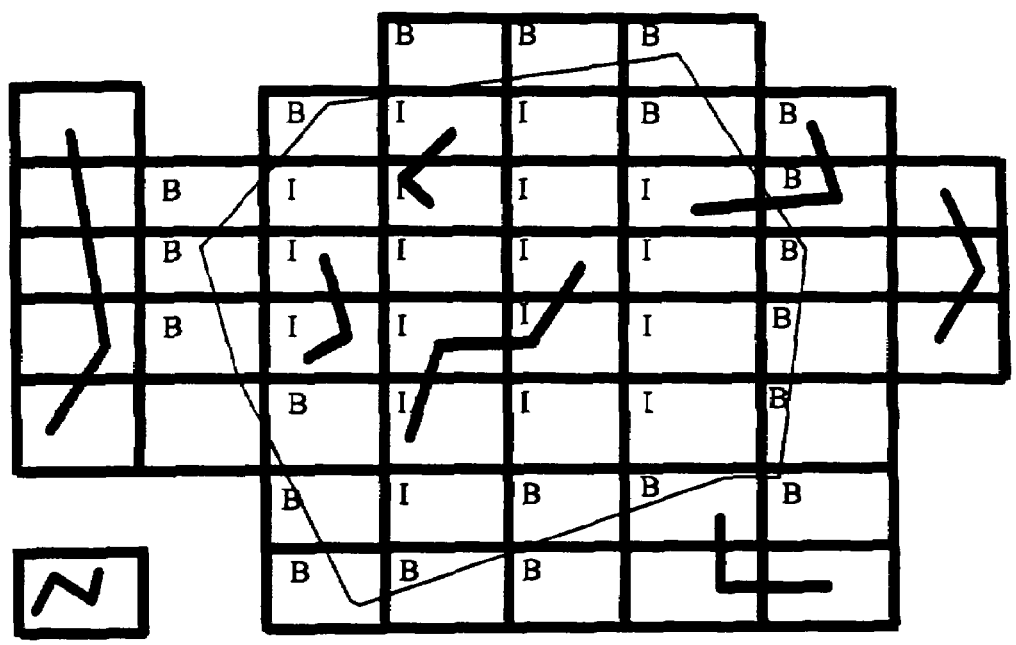
FIG. 8 represents a diagram that illustrates application of an embodiment of a process according to the present invention.

FIG. 7 illustrates a specific example of the implementation of a process according to the present invention. In FIG. 8, the polygon represents, for example, a county. The lines represent streets. In reality, the number of streets would typically be many times greater than is shown in FIG. 8. In this example, the query is to determine which streets interact with the county. As described above, the tiles shown in FIG. 8 may be generated upon the creation of the database. It may be determined the distribution of the streets and the county with respect to the tiles, including determining whether tiles are boundary or interior tiles, as described above. In applying the primary filter, all tiles in common with the street and the polygon are identified.

According to the present invention, all tiles interior to the county and that are boundary or interior to a street will be accepted as also passing the secondary filter without the mathematical comparison. Only streets that only touch a boundary tile of the county will undergo the costly mathematical comparison.

Figure 9:
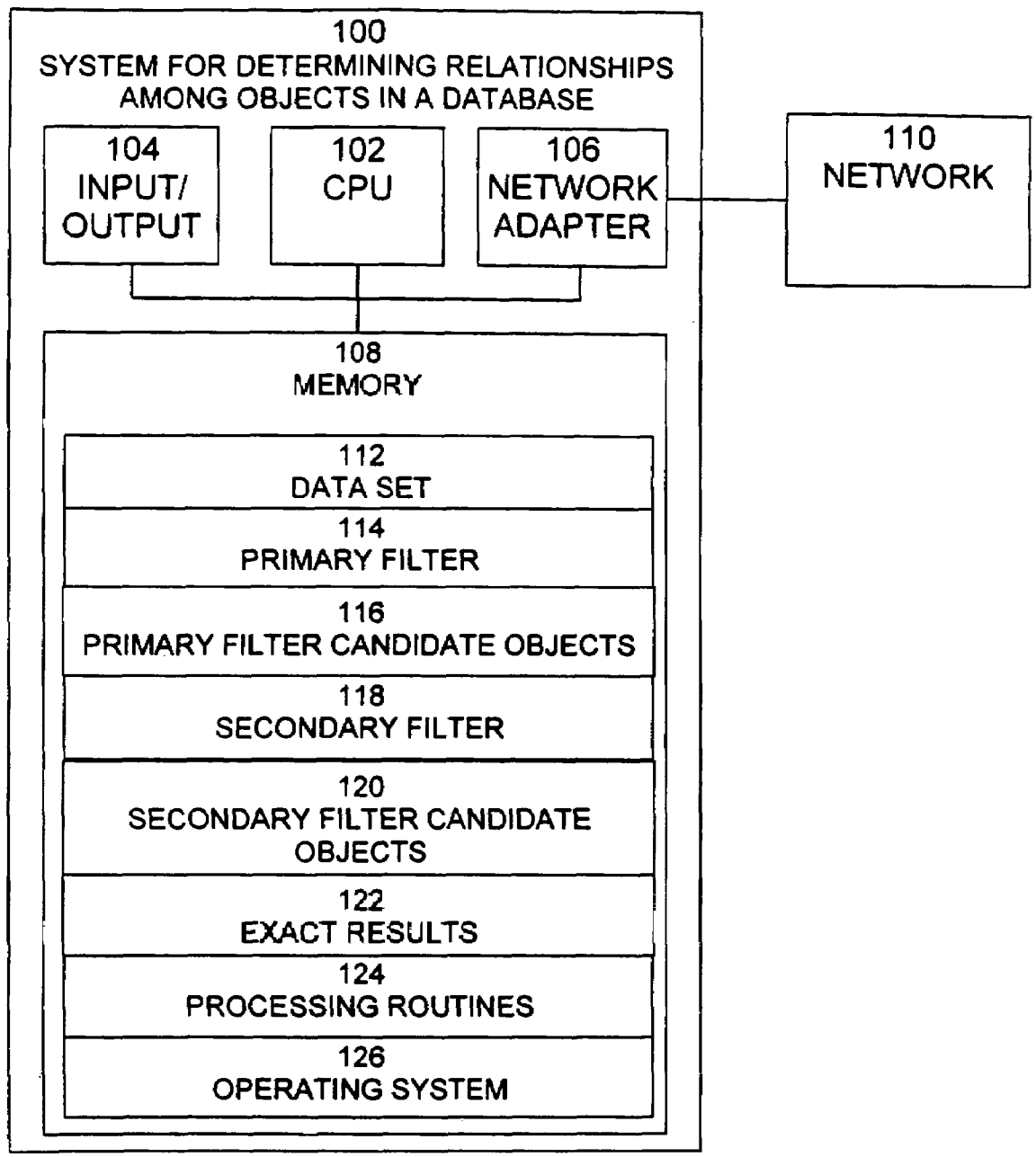
FIG. 9 represents an exemplary block diagram of a transaction processing system.

In the example shown in FIG. 9, it may be desired to determine streets with other spatial relationships to the county. Along these lines, it may be desired to identify streets that only touch the county. In this case, the mathematical comparison may only be carried out for streets that touch boundary tiles and no interior tiles. All geometries that touch interior tiles may be omitted from the mathematical geometric comparison.

While a county, city, zip code region or other examples have been used above, there is no limit on the size of the query geometries. Along these lines, the query geometries may represent locations within the geographic region covered by the database. Perhaps the only limit on the lower limit of the size of the query geometry is the resolution of the database. In one case, the database has a resolution of about 1 meter.

The following represent structured query language (SQL) statements for center tile optimization for different masks. The SQL statements could be used with any database software. One particular database management software system that the SQL statements could be used with is Oracle 9i, available from Oracle Corporation.

The SQL statement below is for finding any interaction between objects.

SELECT distinct data_id, status
FROM
((SELECT a.data_id, 'B' status
FROM wondow_tiles b, data_tiles a
WHERE b.sdo_status = 'B'
AND a.sdo_codes = b.sdo_codes
MINUS
SELECT a.data_id, 'B' status
FROM window_tiless b, data_tiless a
WHERE b.sdo_status = 'I'
AND a.sdo_codes = b.sdo_code)
UNION ALL
SELECT a.data_id, 'I' status
FROM window_tiles b, data_tiles a
WHERE b.sdo_status = 'I'
AND a.sdo_code = b.sdo_codes)";

The next SQL statement may be used for finding objects inside of another object.

SELECT distinct data_id, status
FROM
(SELECT a.data_id, 'B' status
FROM wondow_tiles b, data_tiles a
WHERE b.sdo_status = 'B'
AND a.sdo_codes = b.sdo_codes
UNION ALL
(SELECT a.data_id, 'I' status
FROM wondow_tiles b, data_tiles a
WHERE b.sdo_status = 'I'
AND a.sdo_codes = b.sdo_codes
MINUS
SELECT a.data_id, 'I' status
FROM window_tiless b, data_tiless a
WHERE b.sdo_status = 'B'
AND a.sdo_codes = b.sdo_code)

On the other hand, the SQL statement below may be utilized for identifying object that another object contains.

SELECT distinct data_id, status
FROM
(SELECT a.data_id, 'B' status
FROM wondow_tiles b, data_tiles a
WHERE a.sdo_status = 'B'
AND a.sdo_codes = b.sdo_codes
UNION ALL
(SELECT a.data_id, 'I' status
FROM wondow_tiles b, data_tiles a
WHERE a.sdo_status = 'I'
AND a.sdo_codes = b.sdo_codes
MINUS
SELECT a.data_id, 'I' status
FROM window_tiless b, data_tiless a
WHERE a.sdo_status = 'B'
AND a.sdo_codes = b.sdo_code)

The final example of an SQL statement that may be utilized according to the present invention to identify objects that touch, objects that overlap and have intersecting boundaries, objects that are equal, an object covering another object, and an object covered by another object.

SELECT a.data_id, 'B' status
FROM window_tiles b, data_tiles a
WHERE b.sdo_status = 'B'
AND a.sdo_codes = b.sdo_codes An exemplary block diagram of a system for determining relationships among objects in a database 100, according to the present invention, is shown in FIG. 8. The system for determining relationships among objects in a database 100 is typically a programmed general-purpose computer system, such as a personal computer, workstation, server system, and minicomputer or mainframe computer. The system for determining relationships among objects in a database 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces the system for determining relationships among objects in a database 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as data set block 112, primary filter block 114, primary filter candidate objects block 116, secondary filter block 118, secondary filter candidate objects block 120, exact results block 122, and a plurality of blocks of program instructions, such as processing routines 124 and operating system 126. Data set block 112 stores a plurality of geometries that have been received by the system for determining relationships among objects in a database 100. Primary filter block 114 stores the primary filter condition that may be utilized in determining relationships among objects in the database. The primary filter has been defined based on a relevant interaction among the objects. Primary filter candidate block 116 stores objects that can be determined as fulfilling both the primary filter and the secondary filter after being subjected to only the primary filter. Secondary filter block 118 stores the secondary filter condition that may be utilized in determining relationships among objects in the database. The secondary filter has been defined based on a relevant interaction among the objects. Secondary filter candidate block 120 stores objects that can be determined as fulfilling both the primary filter and the secondary filter. Exact results block 122 stores the candidate objects identified utilizing the system. Processing routines 124 are software routines that implement the processing performed by the present invention. Operating system 126 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A computer implemented method for determining positional relationships among objects represented in a database, the method comprising:
   receiving a query including at least a first object in the database and a desired positional relationship between the first object and a second object in the database;
   in response to receiving the query performing the steps of:
   identifying, for the first object, one or more tiles in a plurality of tiles defined in a spatial index in the database that are interior tiles of the first object and one or more tiles in the plurality of tiles that are boundary tiles of the first object;
   identifying, for the second object, one or more tiles in the plurality of tiles that are interior tiles of the second object and tiles in the plurality of tiles that are boundary tiles of the second object; and
   providing the query to a primary filter operable to:
   compare tiles of the first object with tiles of the second object to determine whether at least one tile of the first object intersects with at least one tile of the second object; and
   determine whether the at least one tile of the second object with which the at least one tile of the first object intersects is an interior tile of the second object;
   if so, providing the first object to a result set of objects that satisfy the desired positional relationship,
   otherwise, providing the first object and second object to a secondary filter operable to:
   compare the second object with the first object; and
   if the first object fulfills the desired positional relationship, include the first object in the result set of objects that satisfy the desired positional relationship;
   otherwise, exclude the first object from the result set of objects that satisfy the desired positional relationship.

2. The method according to claim 1, wherein the desired positional relationship among objects includes at least one member selected from the group comprising:
   the first object in the second object,
   the second object contained by the first object,
   the first object in the second object where a boundary of the first object intersects a boundary of the second object,
   the first object covering the second object where a boundary of the first object intersects a boundary of the second object,
   the first object outside the second object where a boundary of the first object intersects a boundary of the second object,
   the first object does not cover the second object where a boundary of the first object intersects a boundary of the second object,
   the first object overlaps the second object but the boundaries of the first object and the second object do not touch,
   the first object overlaps the second object and the boundaries of the first object and the second object touch,
   the first object is equivalent to the second object, and
   the first object is disjoint from the second object.

3. The method according to claim 1, wherein the tiles all have at least one of the same size and the same shape.

4. The method according to claim 3, wherein the tiles are rectangular.

5. The method according to claim 1, wherein the tiles have different sizes.

6. The method according to claim 1, wherein the database comprises objects on a surface or in a three-dimensional space.

7. The method according to claim 6, wherein the database stores exact representations of the objects and approximate representations of the objects.

8. The method according to claim 7, wherein the objects comprise linestrings and polygons and the method determines positional relationships among the polygons.

9. The method according to claim 8, wherein the linestrings represent streets and the polygons represent a geographic region, and the method determines streets that at least partially fall within the geographic region.

10. The method according to claim 9, wherein the geographic region includes a member selected from the group comprising counties, cities, and zip code regions.

11. The method according to claim 1, wherein the objects comprise polygons and the method determines positional relationships among polygons.

12. The method according to claim 1, wherein the objects are organized with a linear quadtree index.

13. The method according to claim 1, wherein the step of determining whether the at least one tile of the second object with which the at least one tile of the first object intersects is an interior tile of the second object is applied only to objects wherein at least one tile of the first object intersects with at least one tile of the a second object.

14. The method according to claim 1, further comprising:
assigning each tile, a tile code and an associated object as the tiles are defined.

15. The method of claim 1, further comprising the steps of:
exactly comparing the first object the second object if none of the tiles of the second object that intersect with the at least one tile of the first object is a tile that intersects the second object while all of the boundary of the second object lies outside the tile.

16. A computer program product for performing a process for determining positional relationships among objects represented in a database in a computer system, comprising:
a computer readable medium; and
computer program instructions, recorded on the computer readable medium, executable by a processor, for performing the steps of
receiving a query including at least a first object in the database and a desired relationship between the first object and a second object in the database;
in response to receiving the query performing the steps of:
identifying, for the first object, one or more tiles in a plurality of tiles defined in a spatial index in the database that are interior tiles of the first object and one or more tiles in the plurality of tiles that are boundary tiles of the first object
identifying, for the second object, one or more tiles in the plurality of tiles that are interior tiles of the second object and tiles in the plurality of tiles that are boundary tiles of the second object; and
providing the query to a primary filter operable to:
compare tiles of the first object with tiles of the second object to determine whether at least one tile of the first object intersects with at least one tile of the second object; and
determine whether the at least one tile of the second object with which the at least one tile of the first object intersects is an interior tile of the second object;
if so, providing the first object to a result set of objects that satisfy the desired positional relationship,
otherwise, providing the first object and second object to a secondary filter operable to:
compare the second object with the first object; and
if the first object fulfills the desired positional relationship, include the first object in the result set of objects that satisfy the desired positional relationship;
otherwise, exclude the first object from the result set of objects that satisfy the desired positional relationship.

17. The computer program product of claim 16, further comprising the steps of:
exactly comparing a geometry of the first object with the second object if none of the tiles of the second object that intersect with the at least one tile of the first object is a tile that intersects the second object while all of the boundary of the second object lies outside the tile.

18. A system for performing a process method for determining positional relationships among objects represented in a database, comprising:
a processor operable to execute computer program instructions; and
a memory operable to store computer program instructions executable by the processor, for performing the steps of:
receiving a query including at least a first object in the database and a desired positional relationship between the first object and a second object in the database;
in response to receiving the query performing the steps of:
identifying, for the first object, one or more tiles in a plurality of tiles defined in a spatial index in the database that are interior tiles of the first object and one or more tiles in the plurality of tiles that are boundary tiles of the first object;
identifying, for the second object, one or more tiles in the plurality of tiles that are interior tiles of the second object and tiles in the plurality of tiles that are boundary tiles of the second object; and
providing the query to a primary filter operable to:
compare tiles of the first object with tiles of the second object to determine whether at least one tile of the first object intersects with at least one tile of the second object; and
determine whether the at least one tile of the second object with which the at least one tile of the first object intersects is an interior tile of the second object;
if so, providing the first object to a result set of objects that satisfy the desired positional relationship,
otherwise, providing the first object and second object to a secondary filter operable to:
compare the second object with the first object; and
if the first object fulfills the desired positional relationship, include the first object in the result set of objects that satisfy the desired positional relationship;
otherwise, exclude the first object from the result set of objects that satisfy the desired positional relationship.

19. The system of claim 18, further comprising the steps of:
exactly comparing the first object with the second object if none of the tiles of the second object that intersect with the at least one tile of the first object is a tile that intersects the second object while all of the boundary of the second object lies outside the tile.

* * * * *

UNITED STATES PATENT AND TRADEMARK OFFICE
CERTIFICATE OF CORRECTION

| | | |
|---|---|---|
| PATENT NO. | : 7,580,927 B1 | Page 1 of 1 |
| APPLICATION NO. | : 09/865597 | |
| DATED | : August 25, 2009 | |
| INVENTOR(S) | : Daniel Abugov et al. | |

It is certified that error appears in the above-identified patent and that said Letters Patent is hereby corrected as shown below:

In column 3, line 11, after "the" delete "a".

In column 4, line 25, delete "tesselation" and insert -- tessellation --, therefor.

In column 5, lines 13-14, delete "plurality of is tiles. A distribution of objects with respect to the tiles" and insert -- distribution of objects with respect to a plurality of tiles --, therefor.

In column 5, line 38, after "they" delete "1D".

In column 10, lines 43-48, delete "According to the......................mathematical comparison." and insert the same after "identified." on Col. 10, Line 42 as a continuation of the same paragraph.

In column 12, line 59, delete "electromechanical" and insert -- electro-mechanical --, therefor.

In column 14, line 18, in claim 1, delete "and" and insert -- and the --, therefor.

In column 15, line 14, in claim 13, after "the" delete "a".

In column 15, line 19, in claim 15, delete "object" and insert -- object with --, therefor.

In column 15, line 30, in claim 16, after "of" insert -- : --.

In column 15, line 39, in claim 16, after "object" insert -- ; --.

In column 15, line 54, in claim 16, delete "and" and insert -- and the --, therefor.

In column 16, line 43, in claim 18, delete "and" and insert -- and the --, therefor.

Signed and Sealed this

Twenty-ninth Day of June, 2010

David J. Kappos
*Director of the United States Patent and Trademark Office*